J. GEHR.
Plow-Cleaner.
No. 21,953.
Patented Nov. 2, 1858.
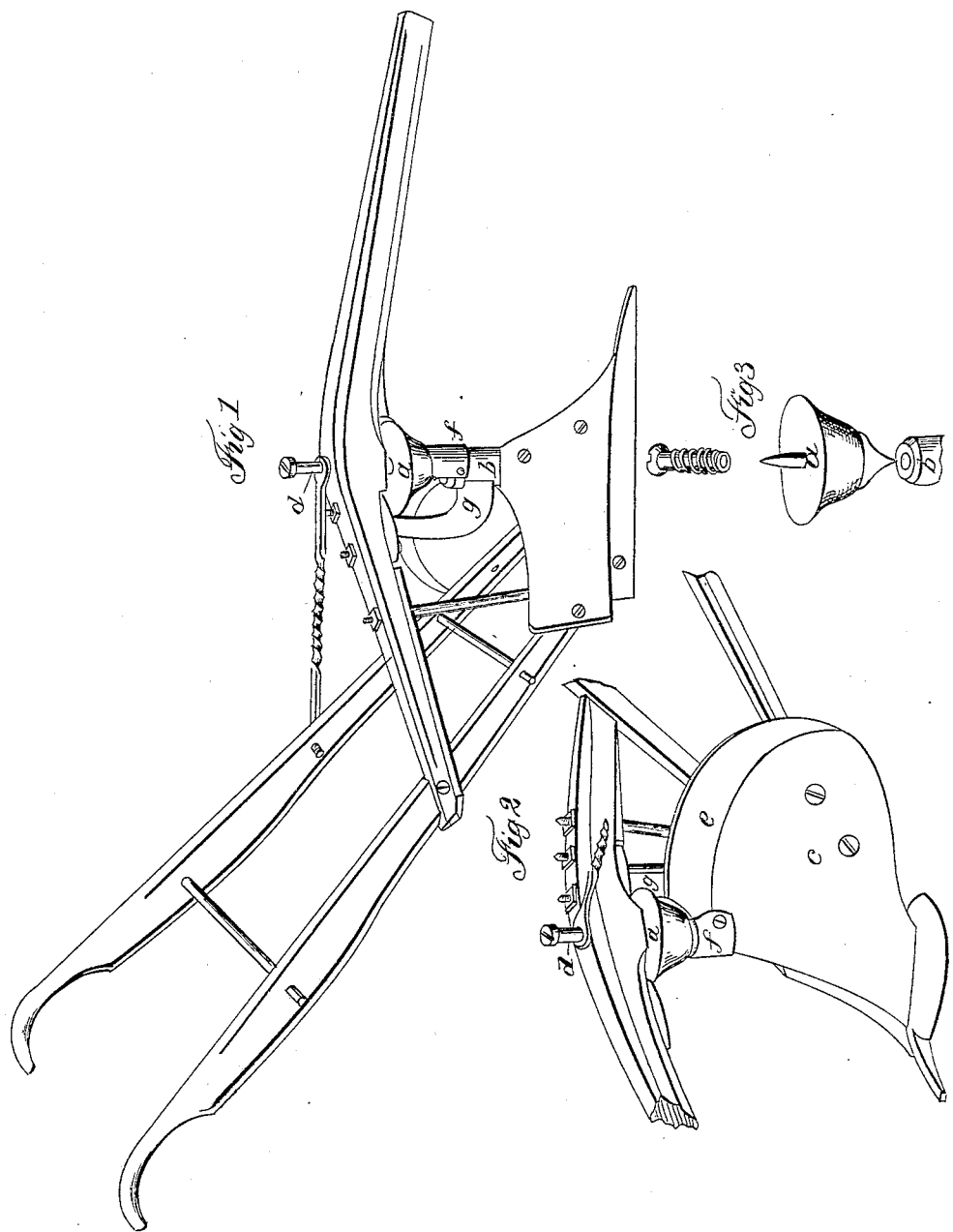

UNITED STATES PATENT OFFICE.

JOHN GEHR, OF COLLEGE OF ST. JAMES, MARYLAND.

IMPROVEMENT IN PLOWS.

Specification forming part of Letters Patent No. 21,953, dated November 2, 1858.

*To all whom it may concern:*

Be it known that I, JOHN GEHR, of the College of St. James Post-Office, in the county of Washington and State of Maryland, have invented a new and Improved Mode of Preventing Plows from Choking; and I do hereby declare that the following is a full and exact description, to wit:

The nature of my invention consists in certain devices for keeping clean the mold-board of the plow, hereinafter more fully described.

To enable others skilled in the art to make and use my invention, I will proceed to describe its construction and operation, reference being had to the accompanying drawings, making part of this specification, in which—

Figure 1 is a side view of the plow with my improvements attached. Fig. 2 is another view of the plow, showing the mold-board; and Fig. 3 is a view of the flanged cleaning-roller.

I construct my plow in any of the known forms, and apply thereto, on the front and top part of the mold-board, a hollow corrugated flanged roller, $a$. The roller is pivoted at one extremity to the upright $b$, to which the mold-board $c$ is attached, and at the other extremity is connected with the beam of the plow by a bolt, $d$, which passes through said beam and enters a hole in the upper conical head of the roller, or arranged in any other manner substantially the same, thereby allowing said roller to revolve freely.

The object of the flange on the roller is to prevent dirt or other matter from entering into the space between the roller and beam, which would tend to clog the operation of said roller. A curved piece, $e$, is attached to the upper part of the mold-board. A guard-piece, $f$, surrounds the lower part of the roller, and is attached to the mold-board, and may also extend and be connected with a brace, $g$, the latter being bent and attached to the upright $b$ at one extremity and the plow-beam at its other extremity, in any well-known manner.

The roller is made hollow in order that it may be lighter, and consequently revolve with more ease. The operation of the device is evident. As the plow is drawn along the roller is made to revolve, imparting a side motion to the dirt and other matter coming in contact with it, thereby keeping the mold-board from becoming foul. The flange on the upper portion of the roller prevents, as before stated, any matter from entering between the upper head of the roller and the plow-beam.

Having thus fully described my invention, what I claim therein as new, and desire to secure by Letters Patent, is—

The hollow corrugated roller $a$, in combination with the mold-board $c$, brace $g$, and guard $f$, the whole being constructed and arranged substantially in the manner and for the purposes set forth.

JOHN GEHR.

Attest:
LEWIS M. HARBAUGH,
THOS. CURTIS.